United States Patent [19] | [11] 4,030,938
Thomas | [45] June 21, 1977

[54] METHOD FOR THE MANUFACTURE OF BOROSILICATE GLASSES

[75] Inventor: Ian M. Thomas, Temperance, Mich.

[73] Assignee: Owens-Illinois, Inc., Toledo, Ohio

[22] Filed: Feb. 3, 1976

[21] Appl. No.: 655,024

[52] U.S. Cl. .................. 106/73.5; 65/DIG. 14; 65/134; 106/54; 252/317; 423/277
[51] Int. Cl.² .................. C03C 3/08; C04B 35/16
[58] Field of Search ............ 106/54, 73.5; 65/134; 252/317; 423/277

[56] References Cited

UNITED STATES PATENTS

| | | | |
|---|---|---|---|
| 3,459,673 | 8/1969 | Best et al. | 106/52 |
| 3,640,093 | 2/1972 | Levene et al. | 65/134 |
| 3,799,754 | 3/1974 | Thomas | 65/134 |
| 3,850,971 | 11/1974 | Termin et al. | 252/317 X |

*Primary Examiner*—Helen M. McCarthy
*Attorney, Agent, or Firm*—Robert F. Rywalski; Edward J. Holler

[57] ABSTRACT

A process is provided for producing carbon free borosilicate glass compositions by hydrolyzing a silicon tetraalkoxide so as to form an at least partially hydrolyzed silicon tetraalkoxide which is then combined with a boron alkoxide and sufficient water to produce a substantially hydrolyzed borosiloxane, or borosilicate precursor, and then this precursor in the presence of free water is fractionally distilled for a time sufficient to remove all alkanol by-product.

5 Claims, No Drawings

METHOD FOR THE MANUFACTURE OF BOROSILICATE GLASSES

The Invention

The present invention relates to the preparation of borosilicate compositions and more particularly relates to the making of such borosilicate glass compositions using boron alkoxides and silicon tetraalkoxides.

The prior art is well aware of methods for manufacturing silicate glass compositions employing silicon tetraalkoxides and various metal alkoxides as starting materials. Exemplary of this art are U. S. Pat. Nos. 3,759,683, 3,640,093, 3,597,252, German Auslegeschrift 1,286,038, and Angewandte Chemie, International Edition, Vol. 10, No. 6, June 1971, pages 363–434. In the process disclosed in the above materials water, a silicon tetraalkoxide, and a metal alkoxide are combined and subsequently the reaction product is heated at a time and for a temperature to form a glass.

Problems exist in the prior art techniques of using alkoxides however in that, upon heating, carbonaceous residues in the form of black specks occur. This obviously is unsatisfactory in applications where extremely high purity and homogeneity are required. While the heating can be effected so as to oxidatively degrade the carbonaceous residues, it is extremely difficult, if not virtually impossible, to thermally degrade the carbonaceous residues in the absence of oxygen. For many applications where high purity is needed it is desirable to effect the formation of glass bodies for example fibers or tubes by practicing the melting step under vacuum or in a closed system. With either of these techniques oxidative degradation of the carbonaceous residue is not possible and thermal degradation is ineffective. Essentially the problem resides in that the reaction product of water, silicon tetraalkoxides and the metal alkoxides contain traces of unhydrolyzed alkoxide groups which result in the carbonaceous or black speck occurrence upon heating. This is because of the following equilibrium reaction between alkoxy groups and water —OR + HOH ⇌ —OH + ROH.

Applicant has discovered that in processes for forming borosilicate glass compositions wherein water, a silicon tetraalkoxide, and a boron alkoxide are combined, with the total amount of water being in excess of the theoretical amount required for hydrolysis of the alkoxide groups, and then the product produced by that combination is concentrated, that the problem with the formation of the carbonaceous residues can be eliminated by fractionally distilling the reaction product of the combination with a fractionating column in the presence of free water for a time sufficient to produce a column head temperature of about 100° C. Of course the concentrating may be effected under conditions of fractional distillation to effect volatilization or conventional heating techniques can be employed, the latter type techniques being preferred. By such fractional distillation alkanol by-product and water are removed as the overhead stream from the fractionating column and the residual reaction product system which is being fractionally distilled becomes progressively more and more concentrated in water. This has the net effect of shifting the equilibrium reaction between the alkoxy groups and water and results in the hydrolysis of all the alkoxy groups and thereby precludes any subsequent difficulties with the appearance of carbonaceous residues or black specks. Thus by incorporating the fractional distillation step subsequent melting can be confidently practiced in closed systems and/or in vacuum melting operations without fear of the occurrence of undesirable black residues.

German Offlengungsschrift 1,216,038 discloses the formation of silicate compositions from the reaction product of water, a silicon tetraalkoxide and a metal alkoxide and discloses the splitting off of the alkanol by-product under vacuum. There is no recognition however of the present inventive contribution therein. U. S. Pat. No. 3,870,656 discloses the formation of silica containing compositions from a hydrogel produced from an alkali metal silicate and discloses distillation of a composite comprising silica in an azeptropic mixture of water and an organic compound. There is no recognition however in this patent of the problem associated with forming a carbonaceous free borosilicate glass.

Thus in accordance with the present invention there is provided a process for producing a carbon free borosilicate which comprises combining a boron alkoxide and an at least partially hydrolyzed silicon tetraalkoxide and fractionally distilling the product in the presence of free water for a time sufficient to remove all alkanol by-product. The fractional distillation is effected with a conventional fractionating column and results, after the removal of all alkanol by-product as indicated by the head temperature of the fractionating column reaching 100° C, in a product which can be heated to a borosilicate glass without fear of the formation of carbon or carbonaceous residues.

In a quite suitable method for practicing the present invention a silicon tetraalkoxide will be hydrolyzed with an excess of a stoichiometric amount of water i.e., with an excess of 2 moles of water per mole of silicon tetraalkoxide and in the presence of an acid hydrolysis catalyst, like HCl or $HNO_3$ or other mineral acids, and there will then be added thereto boron alkoxide followed by the addition to that system of an additional quantity of water with the total quantity of water, i.e., the water used for the hydrolysis of the silicon tetraalkoxide plus the additional quantity of water, being in excess of that theoretically required for complete conversion or complete hydrolysis of the alkoxy groups. The excess ensures the presence of free water. The product is then concentrated, forming a gel which includes alkanol by-product free water, and a substantially hydrolyzed borosiloxane, or borosilicate precursor, and the substantially hydrolyzed borosiloxane fractionally distilled in the presence of free water to hydrolyze residual alkoxy groups. If desired the concentrating can be effected to substantial dryness, i.e., producing a generally dry substantially hydrolyzed borosiloxane, and the dry product combined with an additional quantity of water followed by fractional distillation. Other glass forming metal oxides are preferably incorporated in the form of oxides and/or hydroxides by adding them to residual product of fractional distillation.

The present process is especially well adapted for the production of alkali metal oxide borosilicate compositions, alkaline earth metal oxide borosilicate compositions, and alkaline earth metal oxide-alkaline metal oxide borosilicate compositions. In these instances the alkaline earth metal oxide and/or the alkali metal oxide will be incorporated into the glass forming composition by the addition of the oxide and/or hydroxide. Of course high purity oxides or hydroxides will be employed. These hydroxides or oxides can be conveniently incorporated at various stages in the process but preferably, as generally previously indicated, they are added to the residue after the fractional distillation step.

Exemplary of the boron alkoxides contemplated herein are those of the formula $B(OR)_3$ wherein R is an alkyl group containing from 1 to 6 carbon atoms. Boron trimethoxide is for example quite suitable. Exemplary of the silicon tetraalkoxides are compounds of the formula $Si(OR)_4$ wherein R is an alkyl group of 1 to 6 carbon atoms with the ethoxide group being particularly preferred.

The combining of the boron alkoxide and the silicon tetraalkoxide will be done with an excess of a stoichiometric amount of water, i.e., the total amount of water employed will be in excess of the sum of 2 moles of water per mole of silicon tetraalkoxide and 1.5 moles of water per mole of boron alkoxide employed. Preferably the amount will be on the order of at least about 50% in excess of the theoretical amount. The reaction product after this combination may be considered a substantially hydrolyzed borosiloxane because an excess of the stoichiometric amount of water has been added, but as indicated residual hydrolyzable alkoxy groups are present which, while they are hydrolyzable, or at least can be made hydrolyzable, are apparently very difficult to hydrolyze as indicated by the carbonaceous residues or black specks indicated above. The solution resulting from the combination of the water, silicon alkoxide, and boron alkoxide may then be fractionally distilled with a conventional fractionating column to obtain a fractionating column-head temperature of 100° C., whereby the residual alkoxy groups are hydrolyzed and all residual alkanol is removed, hence producing a product which can be confidently heated without dangers of the formation of carbonaceous residue. The excess of the theoretical amount of water ensures that free water is present and that this water, along with the individual alkanols in the system, form a composition such that upon fractional distillation the overhead or distillate which is taken off is alkanol and/or an azeotrope of alkanol and water and that the residue, i.e., the reactants remaining in the reactor which is being fractionally distilled, during fractional distillation, become progressively more concentrated and rich in water. This has the effect of shifting the alkoxide-water equilibrium reaction to completion.

While the above describes the present invention with sufficient particularity to enable those skilled in the art to make and use same there nonetheless follow further exemplification. In the following example tetraethoxysilane and methyl borate were employed which were distilled prior to use to obtain ultra-high purity. The water employed was doubly distilled water and the nitric acid and sodium hydroxide solution were ultra-high purity reagents obtained commercially from EM Laboratories, Inc.

EXAMPLE

Ethyl silicate (1800 grams) was stirred with water (1000 grams) and 60 ml of 1.0 N nitric acid at room temperature. After about 55 minutes the mixture became clear. Trimethyl borate (929 grams) was then added followed by the addition of more water (500 grams). This system was then heated to concentrate the clear solution and a gel resulted which included a partially hydrolyzed borosilozane, water, and alkanol by-product. The gel was then dried under vacuum for about 8 hours, using an oil bath at about 100° C., to produce about 1951 grams of a fine granular solid. About 500 ml of water was then added and the mixture with the free water present was heated at atmospheric pressure under a fractionating column with all residual alkanols being removed when the head temperature of the fractionating column reached 100° C. The product was then again dried under vacuum at about 130° C. for three hours giving a granular amorphous solid borosilicate product. 1020 grams of the borosilicate product was then mixed in a container, on a roll mill, with about 789 grams of a 30% by weight sodium hydroxide solution. After rolling this product was heated in a flask under vacuum between a temperature of about 130° to 200° C. A fine white powder product was obtained weighing 990 grams which was about 8.8% by weight overweight based on the theoretical oxide composition. The iron analysis of this product was on the order of 60 to 80 parts per billion. A portion of the product was heated in a platinum crucible at a time and for a temperature sufficient to melt the product and resulted in the formation of a clear glass at approximately 1100° C. No problems with carbonaceous residue occurred. The analysis of the glass showed about 52.3% by weight $SiO_2$, about 28.0% by weight $B_2O_3$, and about 19.8% $Na_2O$.

As will be obvious the term fractionally distilling a product or material means that the product or material is heated in a pot under a fractionating column with removal of distillate at the column-head.

I claim:

1. A process for producing an amorphous carbon free, homogeneous borosilicate product comprising
    a. combining a boron alkoxide and an at least partially hydrolyzed silicon tetraalkoxide
    b. fractionally distilling the product of step (a) in the presence of free water for a time sufficient to remove all alkanol by product.

2. The process of claim 1 wherein said at least partially hydrolyzed silicon tetraalkoxide is the reaction product of a silicon alkoxide and an excess of a stoichiometric quantity of water.

3. The process of claim 2 wherein said silicon tetraalkoxide is tetraethoxy silane.

4. A process for producing an amorphous, carbon free borosilicate product
    a. combining water, a silicon tetraalkoxide and a boron alkoxide, the total amount of water being in excess of the theoretical amount required for hydrolysis, so as to form a hydrolysis product
    b. concentrating the hydrolysis product
    c. fractionally distilling the concentrated hydrolysis product in the presence of free water to a fractionating column-head temperature of 100° C.

5. A process for producing an amorphous carbon free borosilicate product comprising
    a. combining water, a silicon tetraalkoxide and a boron alkoxide, the total amount of water being in excess of the theoretical amount required for hydrolysis, so as to form a hydrolysis product
    b. concentrating the hydrolysis product to form a gel
    c. drying the gel
    d. combining an additional quantity of water with the dried gel and fractionally distilling said combination of water and gel with a fractionating column for a time sufficient to hydrolyze residual alkoxy groups.

* * * * *